R. N. CHURCH.
MACHINE FOR ATTACHING AND DETACHING HOSE COUPLINGS.
APPLICATION FILED JUNE 9, 1913.
1,094,978.  Patented Apr. 28, 1914.
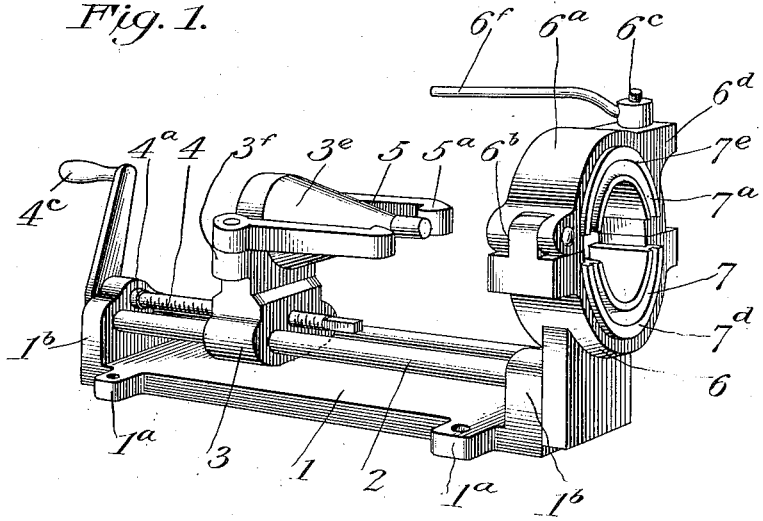
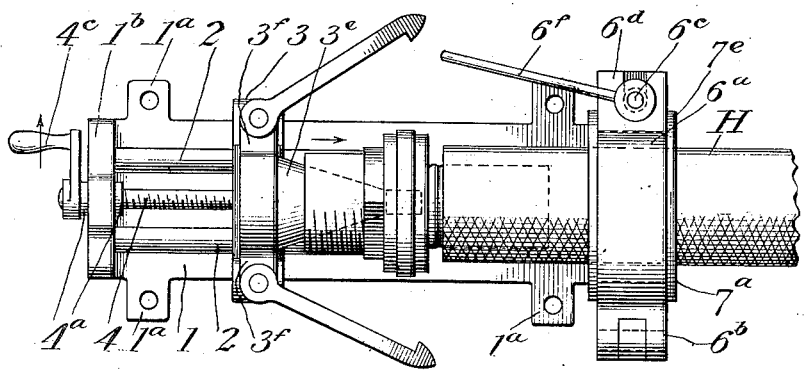
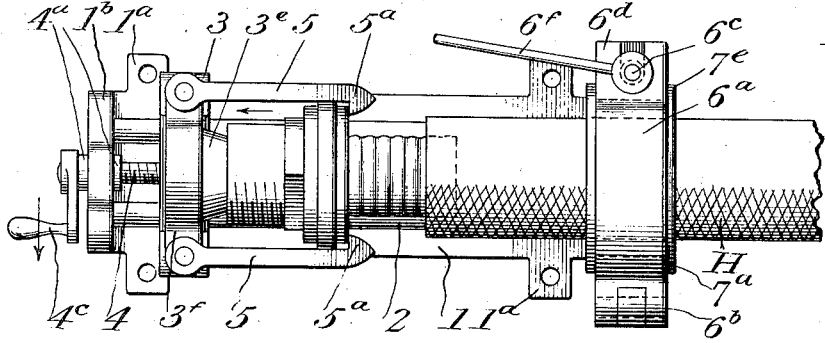
Inventor
Richard N. Church.
Witnesses
Fenton S. Belt
Donald U. Rich
By Dowell & Dowell
Attorneys

UNITED STATES PATENT OFFICE.

RICHARD NOBLE CHURCH, OF SPOKANE, WASHINGTON, ASSIGNOR TO H. B. SHERMAN MANUFACTURING CO., OF BATTLE CREEK, MICHIGAN, A CORPORATION OF MICHIGAN.

MACHINE FOR ATTACHING AND DETACHING HOSE-COUPLINGS.

1,094,978.            Specification of Letters Patent.     Patented Apr. 28, 1914.

Application filed June 9, 1913.    Serial No. 772,591.

*To all whom it may concern:*

Be it known that I, RICHARD NOBLE CHURCH, of Spokane, in the county of Spokane and State of Washington, have invented certain new and useful Improvements in Machines for Attaching and Detaching Hose-Couplings; and I hereby declare that the following is a full, clear, and exact description thereof, reference being had to the accompanying drawings, which form part of this specification.

This invention is a novel machine for use in attaching hose-couplings to hose, and for detaching same therefrom, and its object is to provide a simple machine by which the ordinary hose-coupling may be quickly and effectively connected to the hose without injury thereto; and also by which if desired old couplings may be removed from the hose.

The invention in brief comprises a hose clamp and movable member, preferably operated by a screw, provided with devices by which a coupling may be forcibly inserted into the end of the hose held by the clamp; or by which a coupling may be forcibly withdrawn from the end of the hose held by the clamp. The clamp is also preferably provided with removable and interchangeable bushings by which it can be readily adapted to securely clamp different sizes of hose.

In the accompanying drawings I have illustrated an efficient and simple machine embodying the invention, and will explain same in detail with reference thereto; and in the claims I have summarized the essentials of the invention and also novel features of construction and combinations of parts for which protection is desired.

In said drawings—Figure 1 is a perspective view of the complete device. Fig. 2 is a top plan view showing the device as used for inserting a coupling in the hose. Fig. 3 is a similar view of the device as used for removing a coupling from the hose.

The machine shown has a base plate 1 which may be provided with lugs $1^a$ by which it can be conveniently fastened to a convenient support, such as a bench or work table. This base plate has upstanding end portions $1^b$, between which are parallel rods 2; that extend longitudinally of the base and are preferably made of mild steel and secured to the ends $1^b$ of the bed plate in any suitable manner. The rods 2 form guides for a movable member or casting 3, the lower portion of which has openings for the passage of the guide rods 2 upon which, in the machine shown, the casting is slidably mounted. The member 3 has a threaded opening which is engaged by a screw 4, the outer end of which screw extends through an opening in one of the end uprights $1^b$. This screw may be provided with collars $4^a$ at opposite sides of the upright to prevent longitudinal motion of the screw relative to the bed plate; and said screw may be turned by any suitable means; an ordinary handle $4^c$ being indicated in the drawings. When the screw 4 is turned the member 3 is moved forward or back along the guide rods. This member 3 is provided above the screw with a horizontally extending conical head $3^e$; the smaller end of this head pointing in a direction away from the handle $4^c$. The member is provided at opposite sides of this conical head $3^e$ and near the larger end thereof with lateral lugs $3^f$ on which are pivotally mounted arms 5 which are provided with inwardly projecting hooks $5^a$ on their free ends, for a purpose hereinafter mentioned.

To the end of the bed plate opposite handle $4^c$ is attached a hose clamp, or vise, which comprises a lower semi-cylindric portion 6 and an upper semi-cylindric portion $6^a$ hinged to the lower portion 6 as at $6^b$. To the member 6, at the side opposite the hinge, is pivoted a bolt $6^c$ which is adapted to be swung up into engagement with a notched lug $6^d$ on the adjacent end of the upper member $6^a$; and the free upper end of this bolt $6^c$ is adapted to project above said notched lug and is engaged by a hand nut $6^f$, by which the members of the clamp can be forcibly closed upon and around the hose H as indicated in Figs. 2 and 3.

To enable the clamp to securely hold different sizes of hose; I provide semi-cylindric removable bushings, 7 $7^a$ for the members 6, $6^a$, as shown; said bushings being provided with flanges on their ends; as shown at $7^d$ and $7^e$ respectively; to engage the adjacent ends of the clamp members and prevent longitudinal displacement of the bushings therein. In practice I would provide a number of interchangeable bushings, of different internal diameter, corresponding to the different sizes of hose to be clamped.

In using the apparatus the end of a hose from which a coupling is to be removed is secured in the clamp, as shown in Fig. 3, and the hooks 5ª are engaged with the projecting part of the coupling, then the screw 4 is turned so as to move member 3 outward and draw the coupling out of the hose.

When a coupling is to be inserted in the hose, the coupling is placed on the conical head 3ᵉ and forced into the hose by properly turning the screw 4. This screw and member 3 perform two functions; one is to force couplings into the hose, and the other to pull them out of the hose. The conical head is used in forcing in the couplings and the jaws or claws 5 are used in pulling the couplings out.

It is ordinarily quite difficult to properly secure couplings to large size hose, the common method being to pound the coupling into the hose; and if the coupling is started crooked, it tends to shove the lining out. It has also been very difficult to get couplings out of old hose without injuring the latter. With my machine after the fasteners have been removed from the hose, the coupling can be readily drawn out of the old hose, or a new coupling inserted.

What I claim is:

1. A machine of the character described, comprising a base, uprights thereon, parallel guide rods arranged between and supported by said uprights, a member slidably mounted on said rods, a hose clamp adjacent one upright, a member slidably mounted on said rods, and provided with means adapted to engage a coupling, and a rotatable but longitudinally immovable screw engaging said member for reciprocating the same.

2. A machine for attaching and detaching hose couplings comprising a base, a hose clamp thereon, a member movable to and from said clamp provided with a head adapted to support a coupling while being inserted in the hose, and with devices adapted to engage a coupling to withdraw it from the hose, and means for moving said member so as to forcibly insert a coupling in the hose held by the clamp, or to withdraw a coupling from such hose.

3. In a hose coupling machine the combination of a base, a hose clamp thereon, a member movable on said base to and from said clamp provided with a conical head adapted to support a coupling, a rotatable screw mounted on said base and engaging said member for reciprocating the same, and means for preventing longitudinal movement of the screw.

In testimony that I claim the foregoing as my own, I affix my signature in presence of two witnesses.

RICHARD NOBLE CHURCH.

Witnesses:
FRED A. STOLZ,
L. H. MARONSKI.